(12) United States Patent
Maus et al.

(10) Patent No.: US 6,371,360 B1
(45) Date of Patent: Apr. 16, 2002

(54) METHOD FOR APPLYING BRAZING MATERIAL TO METAL STRUCTURES WITH AN ADHESIVE MATERIAL HAVING DIFFERENT STATES

(75) Inventors: Wolfgang Maus, Bergisch Gladbach; Ludwig Wieres, Overath, both of (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 08/745,487

(22) Filed: Nov. 12, 1996

Related U.S. Application Data

(63) Continuation of application No. PCT/EP95/01591, filed on Apr. 26, 1995.

(30) Foreign Application Priority Data

May 10, 1994 (DE) .......................... 44 16 539

(51) Int. Cl.[7] .................... B23K 1/00; B23K 101/02
(52) U.S. Cl. .................... 228/181; 228/175; 228/248.1; 228/253
(58) Field of Search .................... 228/181, 253, 228/175, 205, 221, 248.1

(56) References Cited

U.S. PATENT DOCUMENTS

| | | | | |
|---|---|---|---|---|
| 4,194,931 A | * | 3/1980 | Zado | 228/223 |
| 4,255,475 A | * | 3/1981 | DelGrande | 228/175 |
| 4,477,527 A | | 10/1984 | Grosner | 428/401 |
| 5,093,545 A | * | 3/1992 | McGaffigan | 228/56.3 |
| 5,431,330 A | * | 7/1995 | Wieres | 228/181 |
| 5,501,391 A | * | 3/1996 | Wieres | 228/181 |
| 5,556,023 A | * | 9/1996 | Kuramoto et al. | 228/248.1 |

FOREIGN PATENT DOCUMENTS

| | | |
|---|---|---|
| DE | 29 24 592 | 5/1983 |
| EP | 0 049 489 | 4/1982 |
| EP | 0 474 909 | 3/1992 |
| WO | 89/11938 | 12/1989 |
| WO | 93/25339 | 12/1993 |
| WO | 94/06594 | 3/1994 |

* cited by examiner

*Primary Examiner*—Samuel M. Heinrich
(74) *Attorney, Agent, or Firm*—Herbert L. Lerner; Laurence A. Greenberg

(57) ABSTRACT

A method for applying brazing material to metal structures is used, in particular, for honeycomb bodies of exhaust gas catalytic converters. The brazing material is applied in the form of a powder and is firmly held to the metal structures through the use of an adhesive material acting as a bonding agent, binder or adhesion promoter. The adhesive material that is used to firmly hold the brazing powder assumes two different states with respect to its adhesive action during the production process of the metal structure. A first state is less adhesive and a second state is more strongly adhesive. The adhesive strength can be selected or adjusted as a function of external conditions, especially temperature. Therefore, at a given time the adhesive material can be put into a state which is suitable for each production step, as a result of which the brazing material quality is increased and the production process is simplified.

40 Claims, 3 Drawing Sheets

METHOD FOR APPLYING BRAZING MATERIAL TO METAL STRUCTURES WITH AN ADHESIVE MATERIAL HAVING DIFFERENT STATES

CROSS-REFERENCE TO RELATED APPLICATION

This application is a Continuation of International Application Ser. No. PCT/EP95/01591, filed Apr. 26, 1995.

BACKGROUND OF THE INVENTION

Field of the Invention

The invention relates to a method for applying brazing material to metal structures, in particular honeycomb bodies for exhaust gas catalytic converters, wherein the brazing material is applied in powder form and is firmly held on the metal structure by an adhesive material acting as a bonding agent, binder or adhesion promoter.

Applying brazing material to metal structures, such as metal catalyst carriers for exhaust gas catalytic converters, is a key problem in the effectiveness of the manufacturing process for such catalyst carriers or for the later strength and durability of the carrier itself.

It is known to apply an adhesive or binder to the metal structures to be joined, when brazing material is applied. The brazing material is in powder form and is either already mixed beforehand with the adhesive or binder or applied to them later.

German Published, Non-Prosecuted Patent Application DE 29 24 592 A1, corresponding to U.S. Pat. No. 4,381,590, describes a method for producing a carrier matrix for a catalytic reactor used for cleaning the exhaust gas of internal combustion engines in motor vehicles. In that method, the corrugated and smooth sheet steel layers are brazed together with spot brazing or full surface brazing, which is carried out by applying a brazing material application to the steel plates, particularly in strips, for instance in the direction of the corrugations of the corrugated steel sheets, or at right angles thereto. Brazing of all of the layers to one another takes place through the use of ensuing heating of the matrix. Liquid brazing paste or powdered brazing material is applied with a binder. The application of the brazing medium or binder is carried out by various methods, such as immersion, pressing in, injection into the end surfaces of the honeycomb body, etc. In order to assure uniform brazing at all of the contact points between the sheet steel layers, an excess of brazing material or binder is generally employed.

In European Patent 0 049 489 B1, a method for producing a carrier matrix for an exhaust gas catalytic converter is described. In that method, the smooth and corrugated metal sheets to be provided with a brazing material application, which are wound to make a carrier matrix for an exhaust gas catalytic converter, are first coated with a pressure-sensitive adhesive which evaporates without residue at the brazing temperature and have a surface on which a single-particle layer of dry brazing powder is applied after the drying. With the applied brazing powder, the steel sheets are then wound up and brazed to one another. A disadvantage in that method may be that the grains of brazing material will be located between the sheet-metal layers to be joined, so that when the grains of brazing material melt an undesirable gap can be created, which is detrimental to the outcome of the brazing.

As a remedy therefor, International Patent Application WO 89/11938, corresponding to U.S. application Ser. No. 08/054,161, filed Apr. 26, 1993 and 08/467,591, filed Jun. 6, 1995, describes a method for applying glue and brazing material to a metal catalyst carrier body, and an associated apparatus. In that method, the metal sheets, before being wound up or layered, are coated in the regions to be brazed with an adhesive or binder, in particular with a pressure-sensitive adhesive. Next, the sheets are wound or stacked to make a honeycomb body, and only then is the body acted upon with brazing powder. As the sheets are further transported after being coated with adhesive, and as the catalyst carrier body is being wound up or stacked in layers, or in other words in all of the handling or transport steps to be provided between the various method steps, the adhesive must be kept in a sticky to liquid state, and as a result it is possible for the adhesive to escape or run out of the catalyst carrier body, or at least for the machine parts that come into contact with the adhesive to become contaminated thereby and in the final analysis become vulnerable to malfunction.

A method and an apparatus for applying brazing material to a metal honeycomb body are also described in International Patent Application WO 93/25339, corresponding to U.S. Pat. No. 5,431,330. In that method, if no rolling oil is present on the surfaces from the manufacturing process, a thin layer of rolling oil is then first applied, which is then thermally treated in order to remove highly volatile components. The regions of the sheet-metal layers that are to be provided with brazing material are put into contact with an aqueous solution of a surfactant, and as a result they form a layer that temporarily acts as an adhesion promoter for brazing powder. After that, the sheets are wound up or stacked into honeycomb bodies. That step is followed by putting the honeycomb bodies into contact with brazing powder. The brazing powder sticks to points where residues of rolling oil and surfactant have come together. Although that method achieves economical use of brazing material, nevertheless the adhering brazing material must also be fixed with an adhesive or binder in an additional work step, to prevent it from trickling out later when transported from place to place.

SUMMARY OF THE INVENTION

It is accordingly an object of the invention to provide a method for applying brazing material to metal structures with an adhesive material having different states, which overcomes the hereinafore-mentioned disadvantages of the heretoforeknown methods of this general type, which employs an adhesive material for firmly holding brazing powder to regions that are to be brazed in metal structures to be joined together having an adhesive strength that can be varied during a production process so that a firm holding of brazing powder can be varied, which averts contamination and blocking of machines or machine parts and which cannot unintentionally flow away from a location where it is applied between the various method steps.

With the foregoing and other objects in view there is provided, in accordance with the invention, a method for applying brazing material to metal structures, in particular honeycomb bodies for exhaust gas catalytic converters, which comprises applying powdered brazing material on a metal structure in association with a production process of the metal structure; and firmly holding the brazing material on the metal structure with an adhesive material acting as a bonding agent, binder or adhesion promoter, having little or no adhesive action during a portion of the production process of the metal structure and having an ability to be subsequently intermittently adhesively activated.

In accordance with another mode of the invention, an adhesive material that is temporarily not adhesive or only slightly adhesive after application and is activatable later, in particular during the production process of the metal structure, or in other words during the various method steps required for the production process and that can assume at least two states which are different in terms of its adhesive action, is employed to firmly hold the brazing powder. One state is a less adhesive state, the other state is a more strongly adhesive state, the states of the adhesive material can be varied as a function of external conditions, such as the temperature, and in particular can be varied reversibly. An adhesive material of this kind that accomplishes its (reversible) states which can be converted to one another by the influence of light, ultraviolet, or other radiation, chemical action or other external factors, may also be used.

In accordance with a further mode of the invention, in a first exemplary embodiment the adhesive material has two aggregate states, namely a solid and a liquid state, and the solid state of the adhesive material can be converted into the liquid state or vice versa within an allowable temperature range that occurs during the production process.

In accordance with an added mode of the invention, a wax which is solid at a normal temperature of approximately 0° C. to 50° C. and is liquid at higher temperatures is employed as a particularly preferred adhesive material.

In accordance with an additional mode of the invention, in a likewise highly preferred exemplary embodiment, the adhesive material is a hot melt adhesive, which has no or only slight adhesive properties at its surface at temperatures below its melting temperature, or in other words approximately 200° C., but develops a strong adhesive action above its melting temperature.

In principle, the adhesive material according to the invention can advantageously be used in all known brazing material application methods in which until now adhesives, binders, pressure sensitive adhesives or adhesion promoters were used.

In accordance with yet another mode of the invention, the adhesive material can be applied before, during or after the winding or stacking of a honeycomb body, and this can be carried out by immersion, spraying, painting and winding-in of adhesive material foil, and so forth.

The adhesive material that changes its state is especially advantageously usable in a method according to International Patent Application WO 93/25339, corresponding to U.S. Pat. No. 5,431,330. In that method, the sheet-metal layers, which as a rule are provided with a rolling oil as a result of a rolling process, are thermally degreased upon being heated, in order to obtain largely grease-free surfaces. The removal of at least highly volatile greases from the surfaces is favorable in some adhesive materials, so that the adhesive material can be applied to the still-hot sheet metal layers without the danger that the adhesive material will fail to adequately bond to the surface of the sheet-metal layers.

In accordance with yet a further mode of the invention, the adhesive material is applied to intended regions. Depending on the intended application and strength required, the application regions of the adhesive material may be larger or smaller and/or may be continuous or discontinuous. This may preferably be carried out through the use of a stick of adhesive material that is in the solid state. The adhesive material becomes liquid upon contact with the hot sheet metal and forms a liquid application. In some embodiments of the method, it may be necessary for the sheet-metal layers to be cooled down separately prior to the winding or stacking, which causes a conversion of the liquid pressure-sensitive adhesive application into a less adhesive state. However, the embodiment of the method may preferably also be carried out in such a way that in the ensuing handling or transport steps prior to the winding or stacking, the temperature lowering is adequate for the adhesive material to become less adhesive and in particular solid. This has the advantage of ensuring that in later processing steps, the adhesive material can no longer escape from the location where it is applied, and the danger of contamination or blockage of machines or machine stations will not ensue. In the cooled down, less adhesive state, the sheet metal layers provided with the adhesive material are then wound, intertwined or placed in stacks to make a honeycomb body. In the process the contact regions between the structured sheet metal layers with the layer of adhesive material between them rest on or slide past one another without sticking together. If reheating of the honeycomb body is then carried out up to a temperature at which the adhesive material is again more strongly adhesive, in particular liquid, then the adhesive material will collect especially in the gaps in the vicinity of the regions to be brazed. In this more strongly adhesive state of the adhesive material, the honeycomb body or portions thereof are acted upon with brazing powder, which remains stuck to the locations provided with adhesive material without difficulties. The stronger the influence of the external conditions, and preferably the higher the temperature to which the adhesive material is exposed, the more adhesive the adhesive material becomes. It is thus even possible with the method according to the invention to control the quantity of brazing powder taken up by the adhesive material within certain limits, depending on the desired strength, and also to influence the spatial distribution of the brazing powder at the locations actually to be brazed, and in particular to cause it to collect in nip regions.

In accordance with yet an added mode of the invention, in the case of some adhesive materials, in particular hot-melt glues, the possibility also exists of applying them to a still-existing film of rolling oil and achieve adhesion to the metal plates. The rolling oil may be used as well to make ensuing steps or winding or stacking easier. The finished honeycomb body is then degreased thermally for the first time. The adhesive remains behind, and in its then liquid state takes up brazing powder in a brazing material application step that is also carried out later at elevated temperature. Proceeding in this way is more favorable from an energy standpoint than thermal degreasing prior to the stacking or winding of the honeycomb body, and a subsequent brazing with still-warm honeycomb bodies can optionally be begun, thereby further saving energy.

In accordance with yet an additional mode of the invention, the adhesive material is applied to desired locations of the sheet-metal layers in a manner which is known per se in its more strongly adhesive, and in particular liquid, state.

In accordance with again another mode of the invention, the sheet-metal layers are wound, intertwined or stacked while the adhesive material is in a less adhesive, in particular solid, state.

In accordance with again a further mode of the invention, there is provided a method of producing honeycomb bodies, especially for exhaust gas catalytic converters of motor vehicles, that are wound, intertwined or stacked from structured sheet-metal layers, and more specifically catalytic converters disposed near the engine, which are needed for reducing pollutants during cold starting and must have an especially high brazing strain. In order to apply the brazing powder to the adhesive material, this material is first put into its adhesive, and in particular liquid, state, and the honeycomb body can then be put entirely or in certain portions into contact with brazing powder, which then remains stuck to the adhesive material at the points involved, with the adhesive material being essentially in the liquid state.

In accordance with again an added feature of the invention, the adhesive material is chosen in such a way that in its more strongly adhesive and in particular liquid or pasty state, it has such high viscosity and adhesion to the metal structures that it collects particularly in gaps and nips to be brazed, at points o f contact of the metal structures, then precisely there the brazing powder required for the brazing process can be bound without using up an unnecessarily large amount of brazing powder. The overall result attained is that an optimal adaptation to desired bonding properties when a brazed metal honeycomb body is produced is possible not only by way of the choice of the adhesive material but also by the purposeful variation of external conditions upon imposition of the brazing material.

In accordance with again an additional feature of the invention, there is provided a special variant of the method which includes imposing hot brazing powder on a honeycomb body provided with adhesive material, the hot brazing powder, wherever grains of brazing occur, briefly converting the adhesive material into its more-adhesive state and then remaining stuck. In that case, heating the entire honeycomb body is unnecessary.

In accordance with a concomitant another mode of the invention, an adhesive material is used that is applied in a first, for instance chemically dissolved state, next it changes into a second state in which it is not adhesive or is only slightly adhesive, until the honeycomb body has been completely wound, intertwined or stacked, and after that, the adhesive material is converted into its more-adhesive state, which is carried out by the influence of temperature or other external provisions, including the action of steam.

The actual brazing process after a honeycomb body is prepared in accordance with the invention m,ay include brazing in a brazing furnace, preferably in a high-temperature vacuum brazing process, in which the adhesive material evaporates essentially without residue by the action of vacuum and/or temperature. Possible residues, such as slight quantities of carbon or the like, do not impair the outcome of the brazing.

Other features which are considered as characteristic for the invention are set forth in the appended claims.

Although the invention is illustrated and described herein as embodied in a method for applying brazing material to metal structures with an adhesive material having different states, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
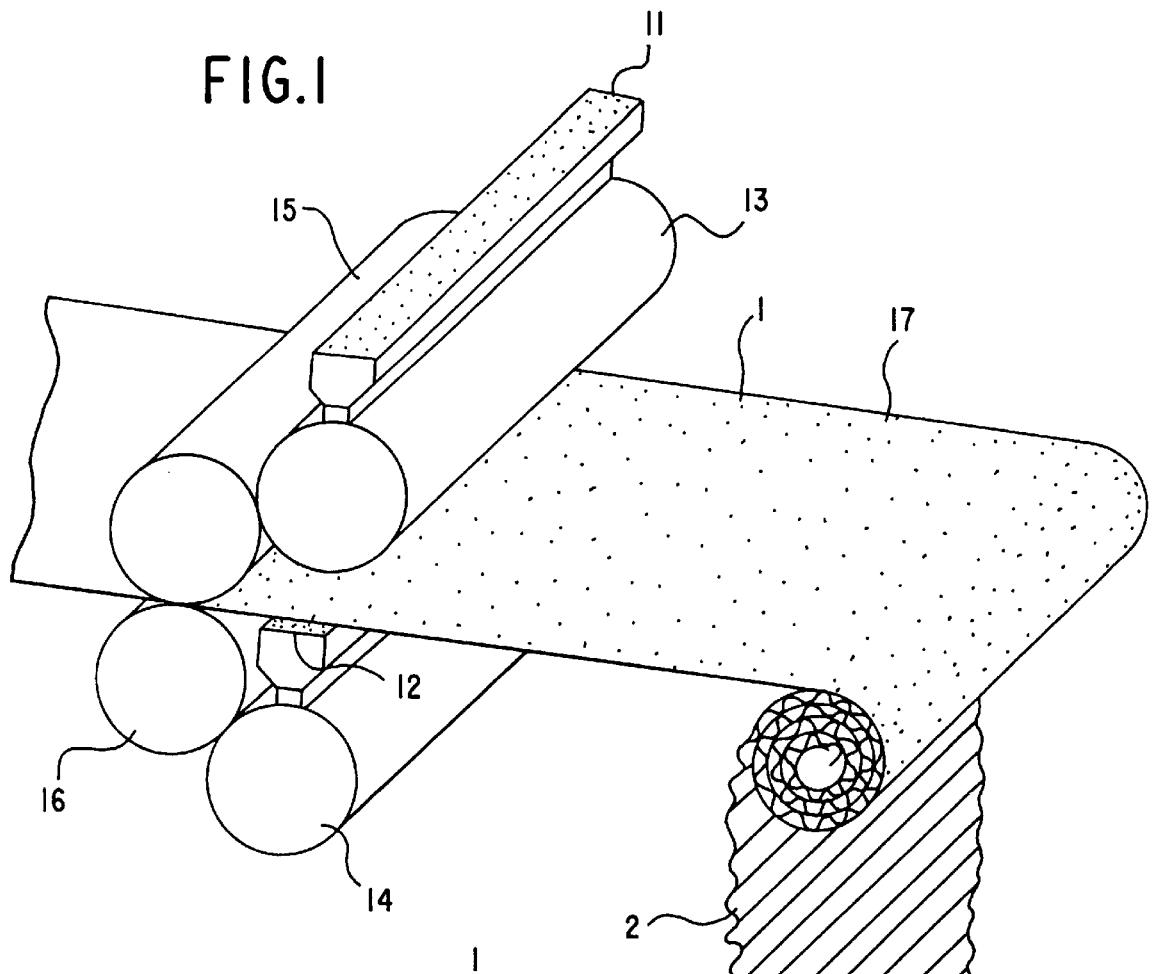
FIG. 1 is a fragmentary, diagrammatic, perspective view of a large-area application of adhesive material to both sides of a foil.

Referring now to the figures of the drawings in detail and first, particularly, to FIG. 1 thereof, there is seen an applicator with which such materials as wax or a hot melt adhesive 11, 12 can be applied to both sides of a smooth waxed metal sheet 1 as adhesive material 17, before the smooth sheet 1 is wound up together with a corrugated metal sheet 2. The adhesive material 11, 12 arrives from a supply container over respective transport rollers 13 and 14 and from there is transferred to applicator rollers 15 and 16, which effect a uniform application on the sheet 1. In order to provide the application, all of the parts of the application station should be at a temperature at which the adhesive material is sticky or liquid. The smooth sheet 1 may be cold or warm.

Figure 2:
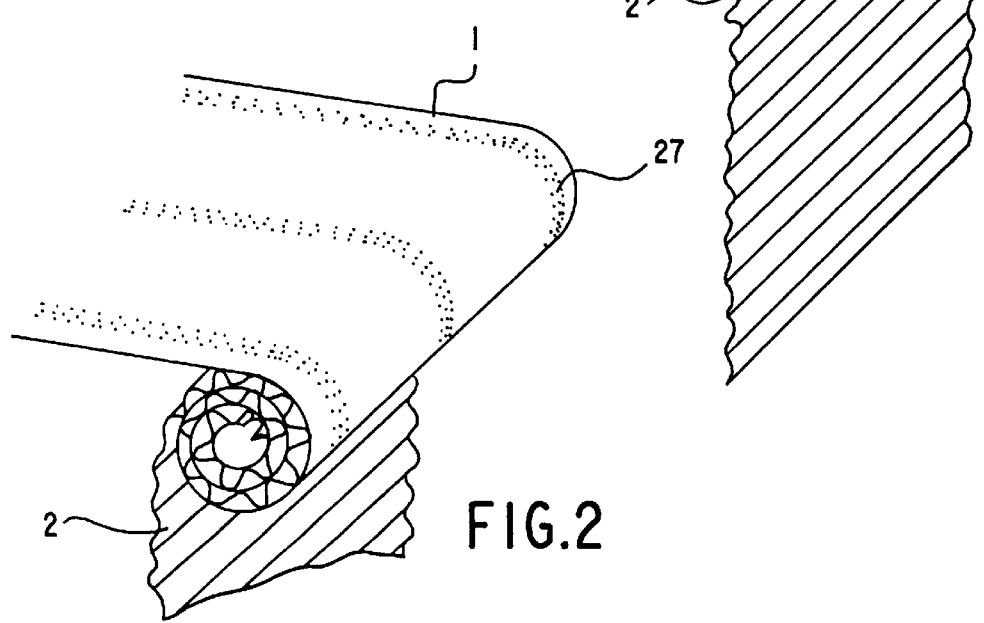
FIG. 2 is a fragmentary, perspective view showing an application of adhesive material in strips.

FIG. 2 shows that the application of adhesive material can also be carried out in strips 27 on the smooth sheet 1.

Figure 3:
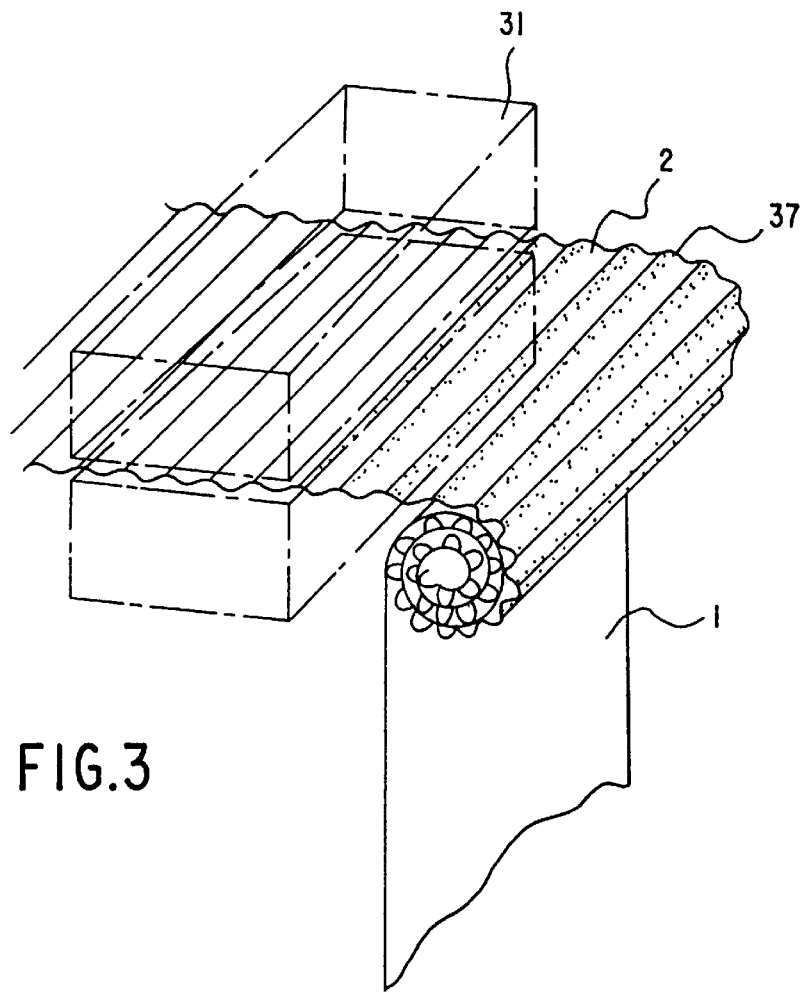
FIG. 3 is a fragmentary, perspective view showing a locally limited application of adhesive material to crests of corrugations of a corrugated foil.

FIG. 3 illustrates the possibility of applying adhesive material 37 not to the smooth sheet 1 but rather to the structured sheet 2, and preferably only to crests of corrugations on both sides. In this case the adhesive material may be removed from a fixed block 31 which is pressed against the structured sheet 2, preferably by causing the sheet 2 to have a higher temperature than the block 31.

Figure 4:
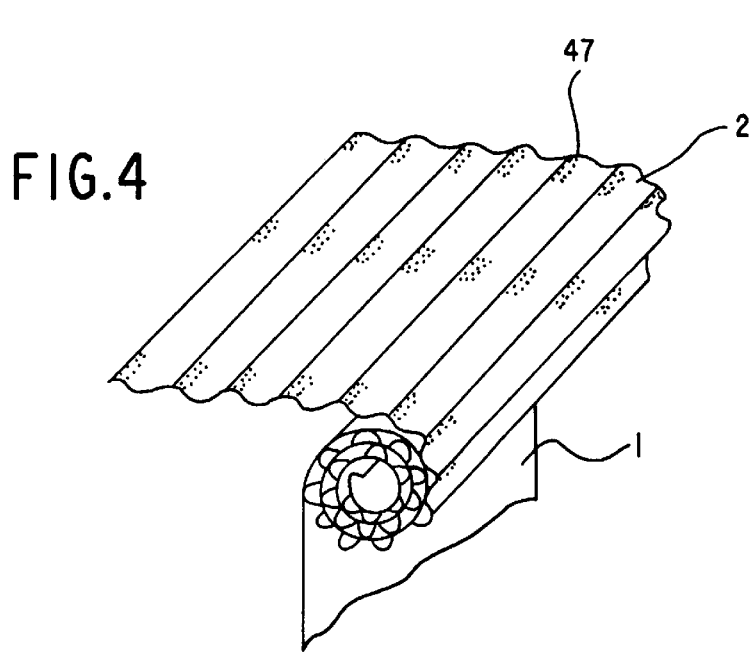
FIG. 4 is a fragmentary, perspective view showing a layer of adhesive material applied over the entire length of a crest of a corrugation (widthwise direction of the corrugated foil)

FIG. 4 in turn illustrates the fact that adhesive material can also be applied in strips 47 to the structured sheet 2, preferably by passing the corrugated sheet 2 slidingly between a plurality of blocks or sticks of adhesive material, preferably at an elevated temperature of the corrugated sheet.

Figure 5:
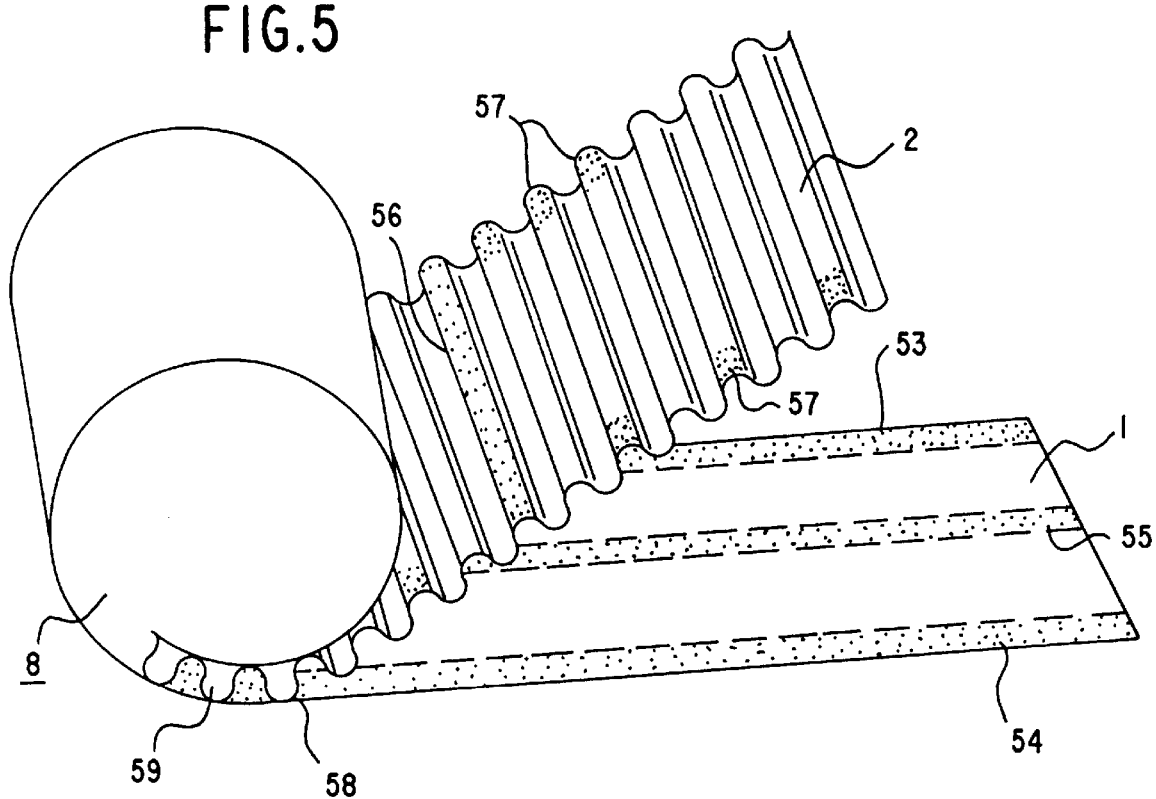
FIG. 5 is a perspective view showing other options for applying a layer of adhesive material.

FIG. 5 shows an overview of various options for applying adhesive material to a smooth sheet 1 and/or a structured sheet 2. The application may be carried out in strips of adhesive material 53, 54, 55 on the smooth sheet 1 and/or as adhesive material 57 at s elected locations on the crests of the structured sheet 2, or as adhesive material 56 over the entire length of crests of a structured sheet 2. The sheets 1, 2 that are coated with adhesive material can then be wound or stacked to make a honeycomb body 8. The structures then result in channels 59 through which an exhaust gas can flow. Naturally, the sheet may also be coated on both sides with adhesive material, as described above.

Figure 6:
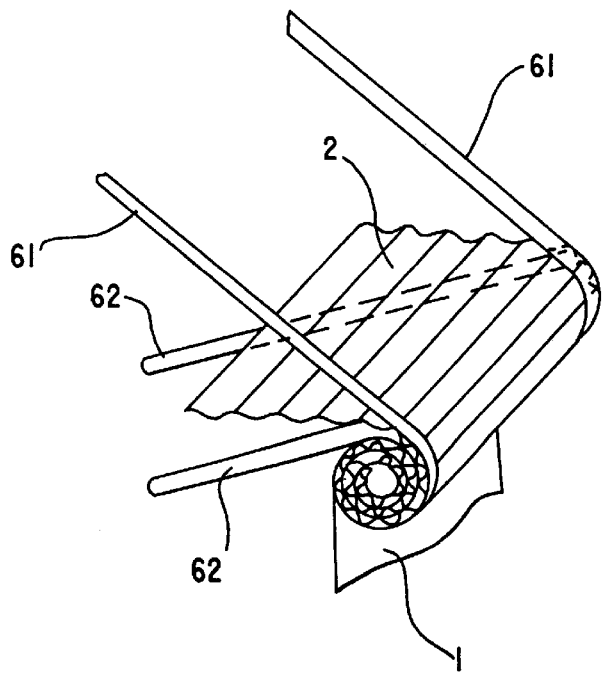
FIG. 6 is a fragmentary, perspective view showing a layer of adhesive material applied in the form of tape to a corrugated strip.

Another possibility for applying adhesive material is shown in FIG. 6, which shows how an adhesive material is wound in strip form between smooth sheets 1 and corrugated sheets 2. It is seen that strips 61 are wound above and strips 62 are wound below the corrugated sheet 2. This manner of applying adhesive material must naturally be carried out at lower temperature or under conditions in which the adhesive material is not so adhesive and is not liquid.

It should be pointed out that the invention is not limited to the exemplary embodiments shown. In particular, the honeycomb bodies to which brazing material is to be applied may also include sheet-metal layers structured in different ways than what is shown, and smooth intervening layers need not necessary be employed. In addition to spirally wound honeycomb bodies, honeycomb bodies intertwined in an S and those with evolute sheet-metal layers and stacked honeycomb bodies are also possible. There is also the greatest possible freedom in the choice of regions to which brazing material is to be applied, so that different zones can have brazing material applied to them in different regions of the honeycomb body. For instance, end surfaces, disklike portions of the honeycomb body, or hollow-cylindrical regions may be provided with adhesive material and may later have brazing material applied to them. It should also be pointed out that the possibility naturally also exists of applying brazing powder to the regions coated with adhesive material even before the winding and under some circumstances even simultaneously with the adhesive material. Once again, various advantages of the adhesive material according to the invention come into play, and especially the possibility, by later conversion of the adhesive material into an adhesive state, of bringing about an increased accumulation of brazing material near points of contact 58 of the sheets, as is indicated in FIG. 5.

The manner of the application of the brazing material and the parameters of the process are described above all in German Published, Non-Prosecuted Patent Application DE 29 24 592 A1, corresponding to U.S. Pat. No. 4,381,590, and International Patent Application WO 89/11938, corresponding to U.S. application Ser. Nos. 08/054,161, filed Apr. 26, 1993 and U.S. Ser. No. 08/467,591, filed Jun. 6, 1995, and will therefore not be described in further detail herein. Another possible way of applying the powdered brazing material is to use a fluidized bed, for instance.

We claim:

1. A method for applying brazing material to metal structures, which comprises:
    applying adhesive material on a metal structure; applying powdered brazing material in pulverulent form on the metal structure in association with a production process of the metal structure; and
    firmly holding the brazing material on the metal structure with the adhesive material having at most slight adhesive action during a portion of the production process of the metal structure and having an ability to be subsequently intermittently adhesively activated.

2. The method according to claim 1, which comprises applying the powdered brazing material on a metal structure of a honeycomb body for an exhaust gas catalytic converter.

3. The method according to claim 1, which comprises holding the brazing material on the metal structure with the adhesive material acting as a bonding agent.

4. The method according to claim 1, which comprises holding the brazing material on the metal structure with the adhesive material acting as a binder.

5. The method according to claim 1, which comprises holding the brazing material on the metal structure with the adhesive material acting as an adhesion promoter.

6. The method according to claim 1, which comprises holding the brazing material on the metal structure with the adhesive material assuming two different states in terms of adhesive action during the production process of the metal structure, one state being a less adhesive state and another state being a more strongly adhesive state, as a function of external conditions.

7. The method according to claim 1, which comprises changing the adhesive states as a function of temperature.

8. The method according to claim 1, which comprises holding the brazing material on the metal structure with the adhesive material assuming solid and liquid aggregate states within an allowable temperature range occurring during the production process prior to actual brazing.

9. The method according to claim 1, which comprises holding the brazing material on the metal structure with a wax adhesive material being solid at normal temperature from approximately 0 to 50° C. and liquid at higher temperatures.

10. The method according to claim 1, which comprises holding the brazing material on the metal structure with a hot melt adhesive material having at most slight adhesive properties at its surface at temperatures below its melting temperature, such as 200° C., but developing a strong adhesive action above the melting temperature.

11. The method according to claim 1, which comprises applying the powdered brazing material on a metal structure for the production of honeycomb bodies being wound, intertwined or stacked from structured sheet-metal layers.

12. The method according to claim 1, which comprises applying the powdered brazing material on a metal structure for the production of honeycomb bodies being wound, intertwined or stacked from structured sheet-metal layers for exhaust gas catalytic converters of motor vehicles.

13. The method according to claim 11, which comprises applying the adhesive material at desired locations of the sheet-metal layers in an adhesive state.

14. The method according to claim 11, which comprises applying the adhesive material at desired locations of the sheet-metal layers in a liquid adhesive state.

15. The method according to claim 11, which comprises performing the winding, intertwining or stacking of the sheet-metal layers while the adhesive material is in a less adhesive state.

16. The method according to claim 11, which comprises performing the winding, intertwining or stacking of the sheet-metal layers while the adhesive material is in a less adhesive solid state.

17. The method according to claim 11, which comprises, after the winding, intertwining or stacking of the sheet-metal layers, placing the adhesive material into its adhesive state, and placing desired portions of the honeycomb body into contact with the brazing powder while the brazing powder adheres to locations being provided with the adhesive material.

18. The method according to claim 11, which comprises, after the winding, intertwining or stacking of the sheet-metal layers, placing the adhesive material into its adhesive liquid state, and placing desired portions of the honeycomb body into contact with the brazing powder while the brazing powder adheres to locations being provided with the adhesive material.

19. The method according to claim 11, which comprises returning the adhesive material to the less adhesive state for further processing, after being acted upon with brazing powder for transport events.

20. The method according to claim 11, which comprises returning the adhesive material to the less adhesive solid state for further processing, after being acted upon with brazing powder for transport events.

21. The method according to claim 1, which comprises holding the brazing material on the metal structure with the adhesive material having a viscosity and an adhesion to the metal structures being high enough to collect and bind the brazing powder in its more strongly adhesive state.

22. The method according to claim 21, which comprises collecting the adhesive material and binding the brazing powder in gaps and nips at contact locations of the metal structures.

23. The method according to claim 1, which comprises holding the brazing material on the metal structure with the adhesive material having a viscosity and an adhesion to the metal structures being high enough to collect and bind the brazing powder in its more strongly adhesive liquid state.

24. The method according to claim 1, which comprises:
thermally degreasing sheet-metal layers having a rolling oil by heating;
applying the adhesive material to the hot sheet-metal layers at regions intended for receiving the adhesive material;
cooling the sheet-metal layers to a temperature at which the adhesive material is less adhesive;
winding, intertwining or stacking the sheet-metal layers to make a honeycomb body;
reheating the honeycomb body to a temperature at which the adhesive material is more strongly adhesive; and
applying the brazing powder to at least portions of the honeycomb body causing the brazing powder to adhere to locations provided with the adhesive material.

25. The method according to claim 24, which comprises carrying out the step of applying the adhesive material with at least one stick of adhesive material in a solid state forming a liquid application upon contact with the hot sheet-metal layers.

26. The method according to claim 24, which comprises carrying out the step of cooling the sheet-metal layers to a temperature at which the adhesive material is solid.

27. The method according to claim 24, which comprises carrying out the step of reheating the honeycomb body to a temperature at which the adhesive material is liquid.

28. The method according to claim 24, which comprises causing the adhesive material to collect in gaps in the vicinity of contact locations to be brazed by the step of reheating the honeycomb body.

29. The method according to claim 1, which comprises:
applying the adhesive material to regions of sheet-metal layers having a rolling oil, the regions being intended for receiving the adhesive material;
winding, intertwining or stacking the sheet-metal layers to make a honeycomb body;
thermally degreasing the sheet-metal layers of the honeycomb body by heating while not removing the adhesive material; and
applying the brazing powder at least to portions of the honeycomb body at a temperature at which the adhesive material is still strongly adhesive, causing the brazing powder to adhere to locations provided with the adhesive material.

30. The method according to claim 29, which comprises carrying out the step of applying the adhesive material by applying a hot melt adhesive in a liquid state which forms a solid application upon contact with the sheet-metal layers.

31. The method according to claim 29, which comprises carrying out the step of applying the brazing powder at a temperature at which the adhesive material is liquid.

32. The method according to claim 29, which comprises causing the adhesive material to collect in gaps in the vicinity of contact locations to be brazed, by the step of applying the brazing powder.

33. The method according to claim 24, which comprises again cooling down the honeycomb body, to which brazing material is applied, to a lower temperature at which the adhesive material becomes solid, and further handling and transporting at the lower temperature.

34. The method according to claim 29, which comprises again cooling down the honeycomb body, to which brazing material is applied, to a lower temperature at which the adhesive material becomes solid, and further handling and transporting at the lower temperature.

35. The method according to claim 24, which comprises hard brazing the honeycomb body to which brazing material is applied.

36. The method according to claim 29, which comprises hard brazing the honeycomb body to which brazing material is applied.

37. The method according to claim 24, which comprises high-temperature vacuum-brazing the honeycomb body to which brazing material is applied in a brazing furnace in which the adhesive material evaporates substantially without residue.

38. The method according to claim 29, which comprises high-temperature vacuum-brazing the honeycomb body to which brazing material is applied in a brazing furnace in which the adhesive material evaporates substantially without residue.

39. The method according to claim 1, which comprises after the winding, intertwining or stacking of the sheet-metal layers, acting upon at least desired portions the honeycomb body with hot brazing powder which upon contact with the adhesive material briefly places the adhesive material into its adhesive state and adheres thereto.

40. The method according to claim 1, which comprises holding the brazing material on the metal structure with the adhesive material having a first state suitable for application, a second state in which it is at most weakly sticky during winding, intertwining or stacking, and a third adhesive state upon imposition of the brazing powder.

* * * * *